United States Patent
Sai et al.

(10) Patent No.: US 12,515,981 B2
(45) Date of Patent: Jan. 6, 2026

(54) APPARATUS TO FABRICATE FIBER OPTIC SENSOR PROBES AND METHOD OF FABRICATION THEREOF

(71) Applicants: Indian Institute of Technology Madras (IIT Madras), Chennai (IN); Ricovr Healthcare Inc., Princeton, NJ (US)

(72) Inventors: Raghavendra Sai, Chennai (TN); V V Lakshmana Swamy, Chennai (TN)

(73) Assignees: Indian Institute of Technology Madras (IIT Madras), Chennai (IN); Ricovr Healthcare Inc.

( * ) Notice: Subject to any disclaimer, the term of this patent is extended or adjusted under 35 U.S.C. 154(b) by 581 days.

(21) Appl. No.: 17/765,443

(22) PCT Filed: Nov. 16, 2020

(86) PCT No.: PCT/IN2020/050962
§ 371 (c)(1),
(2) Date: Mar. 31, 2022

(87) PCT Pub. No.: WO2021/095060
PCT Pub. Date: May 20, 2021

(65) Prior Publication Data
US 2022/0332628 A1 Oct. 20, 2022

(30) Foreign Application Priority Data
Nov. 15, 2019 (IN) .............................. 201941046643

(51) Int. Cl.
*C03B 37/15* (2006.01)
(52) U.S. Cl.
CPC .................................. *C03B 37/15* (2013.01)

(58) Field of Classification Search
CPC .............. B23K 26/073; B23K 26/0869; B23K 26/211; B23K 26/032; B23K 26/21;
(Continued)

(56) References Cited

U.S. PATENT DOCUMENTS 5,216,729 A * 6/1993 Berger ................. G02B 6/4212
385/4
5,235,657 A * 8/1993 Tardy ................... G02B 6/2852
385/32
(Continued)

FOREIGN PATENT DOCUMENTS

CN 110174080 A * 8/2019 ............. G01B 11/26
DE 102016118189 B4 * 8/2018 ............. B23K 26/03
(Continued)

OTHER PUBLICATIONS

Wolfgang PE2E translation DE-102016118189-B4 (Year: 2014).*
(Continued)

*Primary Examiner* — Jodi C Franklin
(74) *Attorney, Agent, or Firm* — Convergence Intellectual Property Law P.C.; Jonathan Garfinkel

(57) ABSTRACT

The invention discloses an apparatus (100) to fabricate U-bent fiber optic sensors, transducers and waveguides, using laser assisted technologies as heat source. The apparatus includes a heating source (110) and a robotic articulate arm (130) that may modify the geometry of an optical fiber (150) with either silica or polymer cladding and fabricate sensor probes by decladding the polymeric cladding in addition to twisting and bending of the optical fiber in an automated manner. The geometry of the optical fiber sensor probe is controlled by the heating source (110), beam (112) thickness, exposure time of fiber and the positioning of a motorized stage. The advantage of the apparatus includes
(Continued)

reduction in fabrication time, repeatable and controllable bend diameter for any size of optic fiber probes.

9 Claims, 12 Drawing Sheets

(58) Field of Classification Search
CPC .. B23K 26/26; B23K 26/064; B23K 26/0734; B23K 26/044; B23K 26/03; B23K 26/32; B23K 26/706
See application file for complete search history.

(56) References Cited

U.S. PATENT DOCUMENTS

| | | | | |
|---|---|---|---|---|
| 5,517,590 | A * | 5/1996 | Auborn | G02B 6/2852 385/32 |
| 2005/0265139 | A1* | 12/2005 | Gomez | G11B 7/1384 369/44.14 |
| 2015/0253513 | A1* | 9/2015 | Stone | E21B 41/0085 385/26 |
| 2015/0336842 | A1* | 11/2015 | Kaneuchi | G02B 6/02 65/392 |
| 2016/0016843 | A1* | 1/2016 | Kaneuchi | C03B 37/15 65/392 |
| 2017/0123164 | A1* | 5/2017 | Suematsu | G02B 6/428 |
| 2017/0371117 | A1* | 12/2017 | Jebali | G01R 19/32 |
| 2018/0215650 | A1* | 8/2018 | Brown | G02B 6/14 |
| 2018/0237331 | A1 | 8/2018 | Nanjo | |
| 2019/0072705 | A1* | 3/2019 | Kaneuchi | G02B 6/424 |
| 2019/0129101 | A1* | 5/2019 | Kaneuchi | C03B 37/15 |
| 2020/0247711 | A1* | 8/2020 | Goldring | C03B 37/15 |
| 2020/0290266 | A1* | 9/2020 | Bhatt | B33Y 10/00 |

FOREIGN PATENT DOCUMENTS

| | | | | |
|---|---|---|---|---|
| EP | 3708289 | A1 * | 9/2020 | ......... B23K 26/0648 |
| EP | 2882563 | B1 * | 7/2021 | ......... B23K 26/0006 |
| JP | S61258205 | * | 11/1986 | ............. C03B 37/15 |
| JP | 6114699 | B2 * | 4/2017 | ............. C03B 37/15 |
| TW | 201206606 | A * | 2/2012 | ........... B23K 26/042 |
| WO | WO/1994/007650 | A1 | 4/1994 | |
| WO | WO-9407650 | A1 * | 4/1994 | ............. B24B 19/16 |
| WO | WO-2020162170 | A1 * | 8/2020 | ........... G02B 6/4219 |

OTHER PUBLICATIONS

JP_6114699_B2_machine_translation (Year: 2017).*
International Search Report and Written Opinion for application No. PCT/IN2020/050962 mailed on Mar. 18, 2021, 8 pages.

* cited by examiner

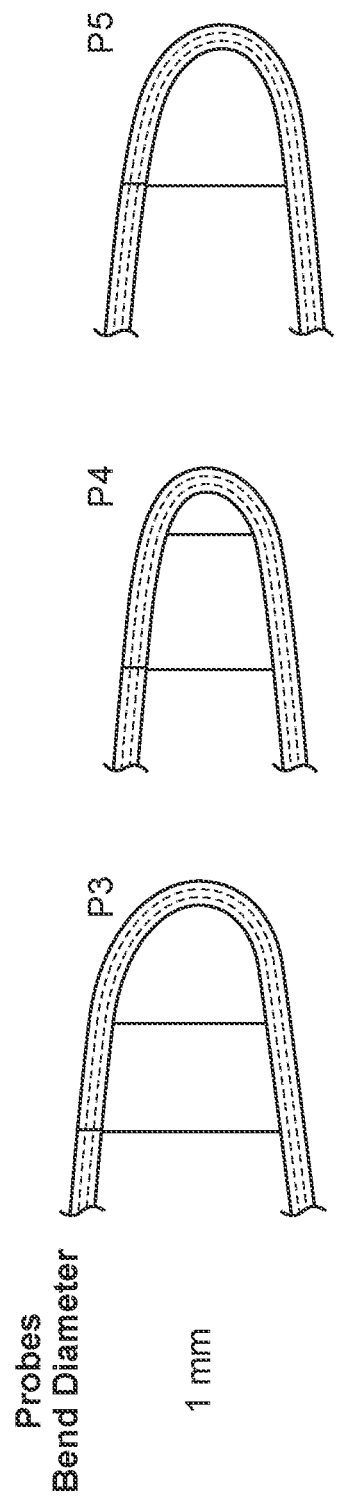
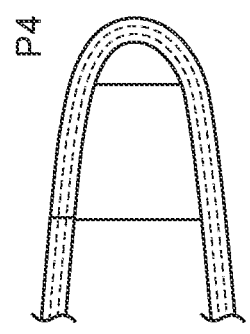
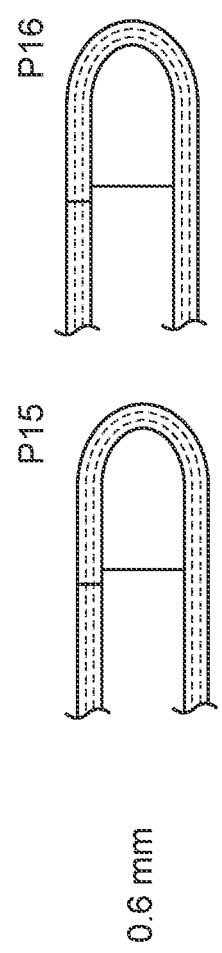
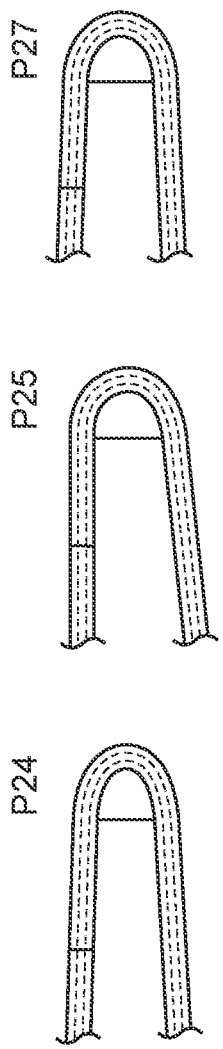
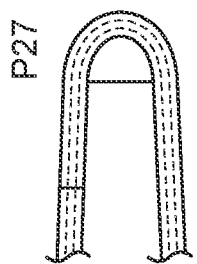

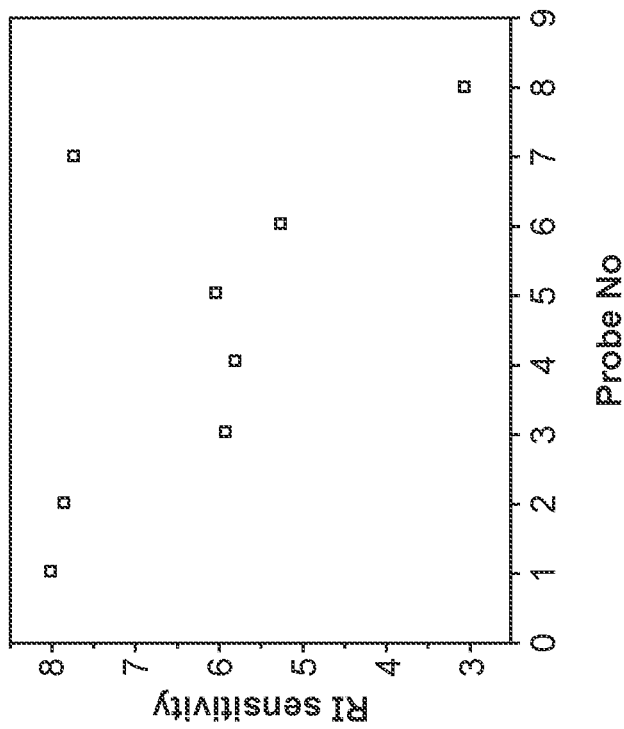
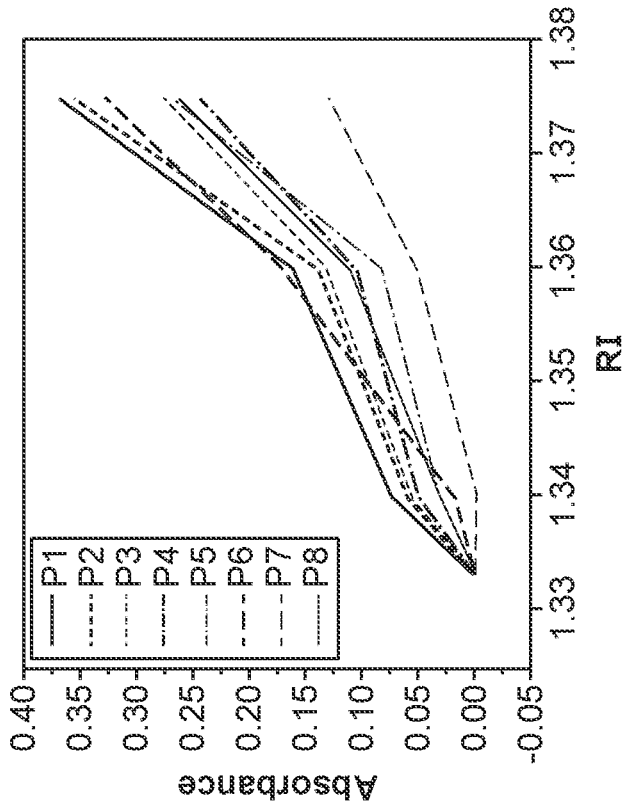
FIG. 6A
FIG. 6B

APPARATUS TO FABRICATE FIBER OPTIC SENSOR PROBES AND METHOD OF FABRICATION THEREOF

CROSS-REFERENCES TO RELATED APPLICATIONS

This application takes priority to Indian provisional patent application no. 201941046643 entitled A Method And An Apparatus To Fabricate Fiber Optic Sensor Probes filed on 15 Nov. 2019.

FIELD OF THE INVENTION

The disclosure relates generally to fiber optic sensors and in particular, to an apparatus to fabricate U-bent fiber optic optic sensor probes in an automated manner.

DESCRIPTION OF THE RELATED ART

Recently, U-bent fiber optic sensor probes have gained a significant attention, mostly due to their high absorbance and refractive index sensitivities owing to the efficient light interaction with the surrounding medium, sample volumes as low as several tens of micro litres with a possibility for dip-type sensing and ease in probe handling. Multimode as well as single mode optical fibers with silica as well as polymeric fiber core have been utilized to fabricate Ubent fiber optic probes for chemical and biosensing applications. Fiber optic optic probes have been widely applications due to their suitability over a wide range of wavelengths, high chemical and thermal stability and established surface modification techniques.

Over the past three decades, a significant number of studies reported fabrication of U-bent fiber optic optic sensor probes (UFOS) by manual means. The fabrication process typically involves exposure of the silica core to a butane flame to rise the temperature of the silica core between 800 and 1200° C. in order to be able to melt the fused silica over a controlled length of the fiber, before subjecting it to bending. It is important to note that the analytical response of the UFO is highly influenced by its physical geometry, in addition to several optical parameters. Some of the major constraint in the manual means of bending include a huge inconsistency in the U-shape geometry amongst the fabricated probes, in addition to the requirement of skilled hands. Significant deviation in the U-shape from a desired bend diameter and tilt in the bend plane are very common leading to large probe-to probe variations which are known to directly influence the evanescent wave absorbance and refractive index sensitivities of the probe. Thus, U-bent probes fabricated by manual means require a thorough characterization of their geometry as well as sensitivities and involves rejection of probes as high as 50-70% of the total number of fabricated probes in a batch.

To overcome the above-mentioned limitations, Chiang and co-workers have reported an innovative technique with a semi-manual mechanism to improve the reproducibility of the bend geometry. Here, the fiber distal ends are held together and passed through an orifice whose diameter is equal to that of the desired bend diameter. The fiber ends are held tightly to a fixed support and the metal plate, to which the orifice is attached, is moved away from the support while exposing the bend region to the butane flame. Although this technique allows fabrication of UFOS by a simple means, it is limited to smaller diameters fibers (e.g. single and multi mode fibers less than a total diameter of 125 Om). The minimum length of optical fiber required to bend the fiber increases with its diameter due to the necessity to hold their distal ends together, resulting in wastage of fiber. Also, a torsion in the fiber arms could be another possibility unless the fibers are maintained in a plane perpendicular to the gravity. In addition, the flame based heating suffers from deformities in the U-shape of the probe upon overexposure of the newly formed U-bend region to the flame, which necessitates a precise control over the flame exposure.

The U.S. Pat. No. 5,970,749A discloses an automated environment during the fabrication process of optic fibers that uses a combination of clamps to secure the optical fibers and movable gripping devices that transport the optical fiber while maintaining control of the ends of the optical fibers. A biosensor having an optical fiber having at least one curved portion configured to enhance penetration of evanescent waves and one or more nanoparticles associated with the optical fiber, and configured to enhance localized surface plasmon resonance is described in the U.S. Pat. No. 8,703,505B2. "Fabrication of a fiber probe using a CO2 laser for microstructure measurement: High functionality and durability test", Uchiyama et al (2018), Procedia CIRP Volume 77, 2018, Pages 513-516 discloses fabricating a stylus tip using laser. "Fabrication and characterization of U-shaped fiber-optic pH probes", Gupta et al (2002), Sensors and Actuators B Chemical presents fabrication and characterization of U-shaped fiber optic pH probes utilizing evanescent field absorption spectroscopy and dye doped sol-gel immobilization technology are presented.

Disclosed herein is an apparatus that may automate the fabrication of the U-bend fiber optic probe.

SUMMARY OF THE INVENTION

Systems, devices and methods of automated fabrication of fiber optic U-bent probes are disclosed. The invention in some embodiments discloses an automated fiber bending machine. The machine comprises a heating source configured to emit a laser beam and heat one or more silica fibers. A beam deflection module is configured to direct the laser beam to the one or more silica fibers for heating. The machine further comprises a robotic articulating arm assembly comprising two independent arms each arm having a first end and a second end and rotating about an axis. A shaft is configured to mount the second end of each arm and rotate the arms about the same axis. At least one servomotor is attached to each arm, and each motor is mounted with a spur gear configured to drive the arms. At least one gripper in each arm is configured to hold the fiber in position. A control system is configured to direct the heat source to heat a bend portion of the fiber and to actuate the servomotors to displace the arms angularly and bend the fiber at the bend portion to a predetermined bend diameter.

In some embodiments, the heating source is a $CO_2$ laser. In some embodiments the control system comprises a microcontroller having a processor, memory, a display, and a keyboard. The microcontroller is configured to actuate the heating source, the beam deflection module, and the robotic arm assembly in a predetermined sequence based on instructions stored in the memory, or inputs received via the keyboard or both. In some embodiments the beam deflection module is configured to linearly displace a focal spot of the laser beam along the bend portion of the fiber to either remove polymer cladding thereon or to heat the fiber to the predetermined temperature. The machine may comprise a mandrel, wherein the bend diameter of the fiber is controllable by varying a diameter of the mandrel.

In some embodiments, the deflection module may comprise a first mirror fixed at a predetermined angle with respect to the emitted laser beam and configured to reflect the beam through an angle, a second mirror configured to receive the reflected beam from the first mirror and reflect the beam through an angle; and a third mirror configured to receive the reflected beams from the second mirror in an X-Y plane and deflect the beam in a Y-Z plane towards the one or more silica fibers. In some embodiments the first mirror is placed at an angle of 60° and the second and the third mirror are placed at an angle of 45° with respect to the emitted laser beam.

In various embodiments, the laser is controlled by a pulse width modulated signal. In some embodiments, the articulating arm assembly is configured to hold the fiber on a first end in one arm and a second end with in the other arm with the bend portion held therebetween.

A method of fabricating a U-bent optic fiber probe is disclosed. The method may comprise the steps of holding an optic fiber having a first end, a second end and a bend portion therebetween in a robotic articulating arm assembly, the assembly comprising two independent arms each arm having a first end and a second end and rotatable about an axis, the axis having a mandrel affixed thereon, heating the optic fiber in the bend portion using a laser heating source to a predetermined temperature to cause softening thereof, and bending the fiber at the bend portion by angularly displacing the arms simultaneously about the mandrel to a predetermined bend diameter.

In various embodiments, the bend diameter of the fiber is controllable by varying a diameter of the mandrel. In various embodiments of the method, the heating the optic fiber in the bend portion comprises receiving a triggering pulse at the heating source from a control system, and raster scanning a laser beam along the bend portion. herein heating the optic fiber in the bend portion and bending the fiber comprises decladding the bend portion by heating to a first predetermined temperature at a first laser power level. The method then comprises heating the bend portion to a second predetermined temperature at a second laser power level to cause softening of the fiber. Thereafter the method comprises receiving a signal from the control system to displace the arms angularly and bend the fiber at the bend portion to the predetermined bend diameter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 5A-5J illustrates the photographic images of the U-bent probes with different diameters.

FIG. 6A illustrates the response of probes to different RI medium.

FIG. 6B illustrates RI sensitivity of the probes to different RI medium.

Referring to the drawings, like numbers indicate like parts throughout the views.

DETAILED DESCRIPTION OF THE EMBODIMENTS

Figure 1A:
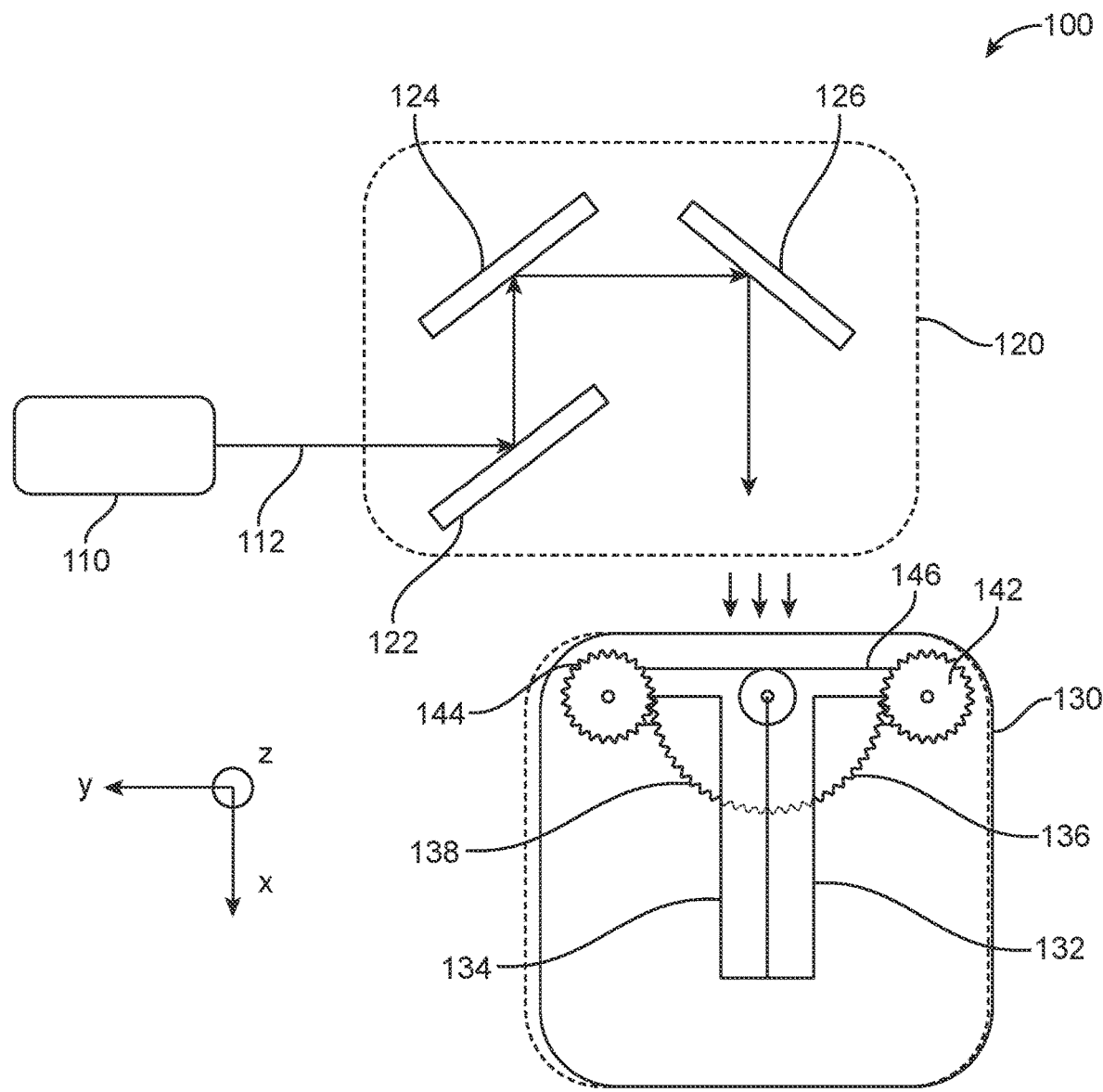
FIG. 1A illustrates the components of the automated fiber bending machine.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The invention discloses an apparatus to fabricate U-bent fiber optic sensors, transducers and waveguides, using laser assisted technologies as heat source. The apparatus includes a robotic articulate arm that may modify the geometry of an optical fiber with either silica or polymer cladding and fabricate sensor probes by decladding the polymeric cladding in addition to twisting and bending of the optical fiber in an automated manner. The geometry of the optical fiber sensor probe is controlled by the heat source, beam thickness, exposure time of fiber and the positioning of a motorized stage.

In various embodiments an automated fiber bending machine (AFBM) 100 is disclosed. The AFBM 100 includes a heating source 110 and a robotic articulating arm assembly 130 as shown in FIG. 1A. The heating source 110 is configured to emit laser beam 112 and heat one or more optic fiber 150. The laser beam forms a laser spot on the optic fiber at a location on the fiber that has to be bent. In various embodiments the heating source imparts controlled heating to the fiber to maintain the fiber core at the glass transition temperature for bending. In various embodiments the heating source 110 is a laser source. In some embodiments the laser is a $CO_2$ laser. The heating source 110 is controlled by a pulse width modulated signal fed to the RF amplifiers of the heating source 110. In one embodiment a focusing lens was not used to focus the laser spot on the silica fibre 150. In another embodiment a focusing lens was used to focus the laser beam on the silica fibre 150. In various embodiments a heat sink is incorporated to maintain the temperature of the heating source. In various embodiments the optic fiber is made of either silica or polymer cladding.

In some embodiments the laser focal spot may be moved up and down along the fiber and generally displaced in x, y or z directions as illustrated in FIG. 1A. In some embodiments the machine includes a beam deflection module 120 that may linearly displace the spot to remove the silica or polymer cladding over a desired length on the one or more fibers 150. The deflection module 120 includes a first mirror 122, a second mirror 124 and a third mirror 126 held using kinematic mounts. In some embodiments the first mirror 122, the second mirror 124 and the third mirror 126 are silicon mirrors coated with gold. In various embodiments the laser beam 112 is deflected at 60° angle to the beam 112 by the first mirror 122 onto the second mirror 124 of the translational stage. The laser beam deflected from the second mirror 124 is directed in the third mirror 126, which deflects the beam towards the one or more optic fibers 150. The second mirror 124 and the third mirror 126 are part of a translational stage. The mirrors 124, 126 are placed at 45° angle to the beam. In various embodiments a stepper motor is configured to drive the translational stage. In various embodiments the beam deflection module 120 is configured to linearly displace the heating source 110 and adjust the focus of the heating source 110 to either vary an effective length of the fiber subjected to exposure to remove a polymer cladding over a desired length of the optic fiber 150 or to allow fine tuning of the bend diameter.

Figure 1B:
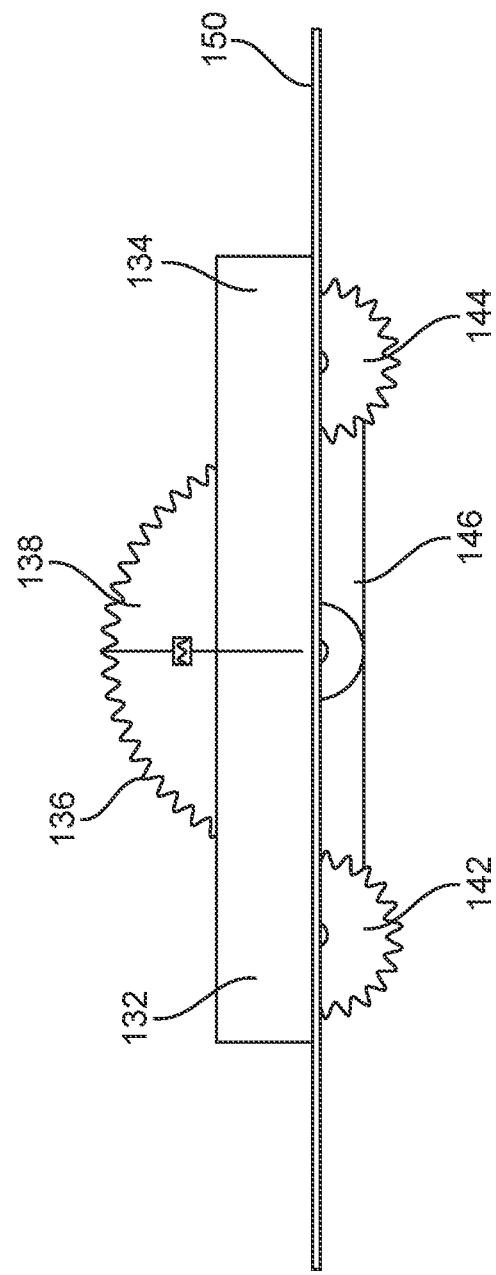
FIG. 1B shows the graphical illustration of the fiber bending using the articulating arms mechanism.

In various embodiments the AFBM 100 includes a robotic articulating arm assembly 130 configured to hold the fiber 150 in a straight manner and angularly displace the straight fiber portions with respect to a central region exposed to the laser spot. In various embodiments robotic articulating arm assembly 130 has two independent arms 132, 134 each arm having a first end and a second end. The second end of each arm are closer to each other and the second ends rotate about an axis. At least one servomotor 142, 144 is attached to the first arm 132 and the second arm 134. In various embodiments the servo motors 142, 144 are mounted with a spur gear 136, 138 that drives the respective arm 132, 134 through a reduction gear mechanism as shown in FIG. 1B. In various embodiments a shaft 146 as shown in FIG. 1B is configured to mount the second end of the arms 132, 134 and rotate the arms 132, 134 about the same axis. In various embodiments each arm 132, 134 has at least one gripper in each arm configured to hold the fiber in position. In various embodiments the gripper has at least a micro servomotor to hold the fiber optic 150.

In various embodiments the fiber 150 has a first end 152, a second end 154 and a bend region 156 that has to be bent. In various embodiments the bend region 156 is in the center of the optic fiber 150. In various embodiments the polymer cladding over the optic fiber core is decladded in the region to be bent. In various embodiments the decladded region of the fiber to be bent is placed exactly at a centre of the shaft 146 of the articulating arms 130 to hold the fiber 150 stationary with respect to the laser beam. In various embodiments the heating source 110 is configured to heat the bend region 156 of the fiber. The laser beam from the second mirror 124 in the translational stage is directed in the X-Y plane to the third mirror 126, which deflects the beam in Y-Z plane on to the decladded region of the fiber that is held in the articulating arms 130.

Figure 1C:
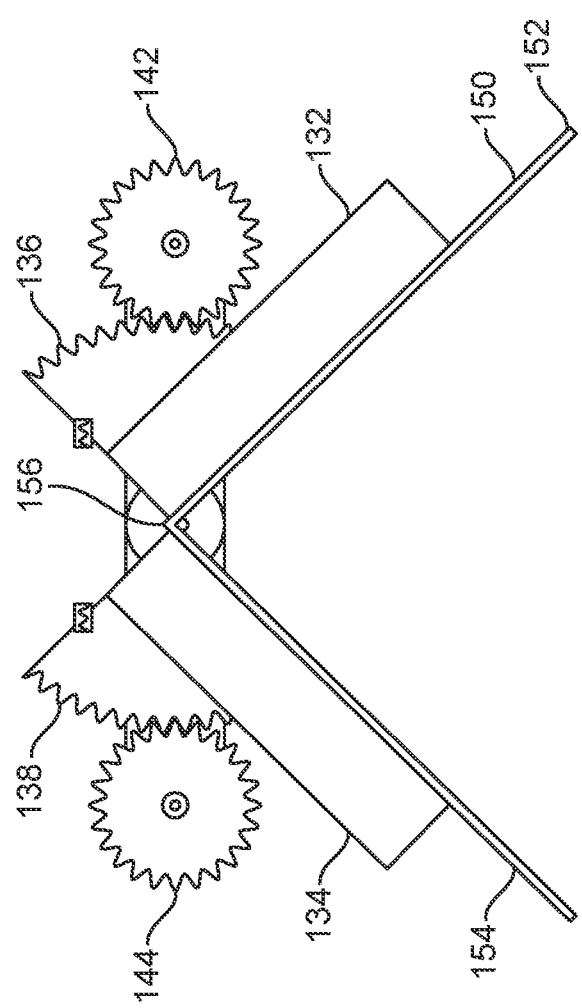
FIG. 1C shows the graphical illustration of the fiber bending using the articulating arms mechanism.
Figure 1D:
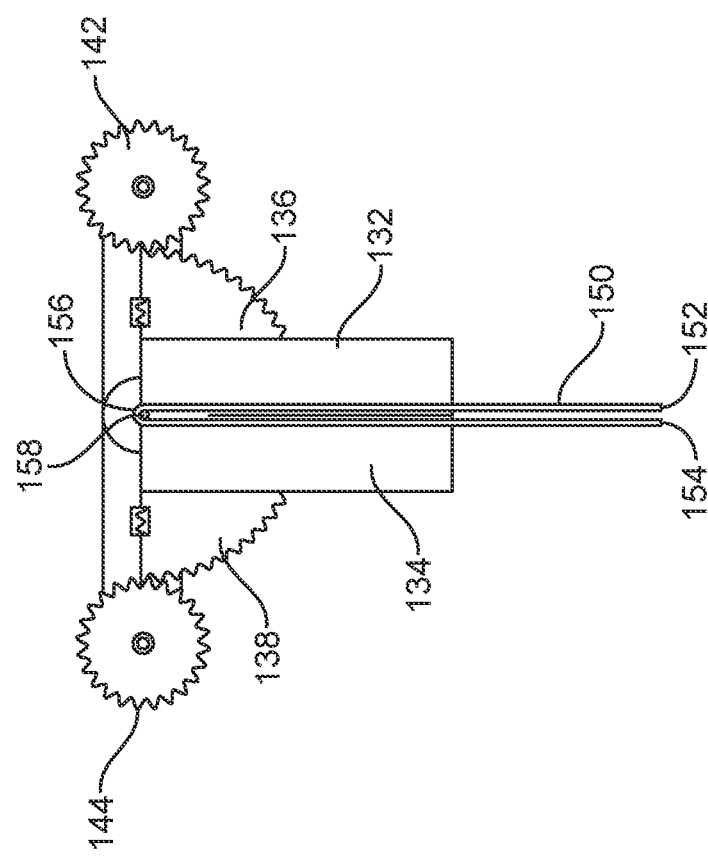
FIG. 1D illustrates the graphical illustration of the fiber bending using the articulating arms mechanism.

In various embodiments the arms are simultaneously displaced angularly as shown in FIG. 1C by the servomotors that rotate from 0° to 90° and 90° to 180° and the fiber 150 is bent in a bend region 156 to a predetermined bend diameter as shown in FIG. 1D. In various embodiments the fiber 150 is bent around a mandrel 158 and the bend diameter of the fiber is controllable by varying a diameter of the mandrel 158. In various embodiments the fiber core diameter is in the range of 200 to 600 µm. In some embodiments, the maximum fiber core diameter that may be formed into a U-shaped fiber optic sensor may extend up to 1000 µm.

Figure 1E:
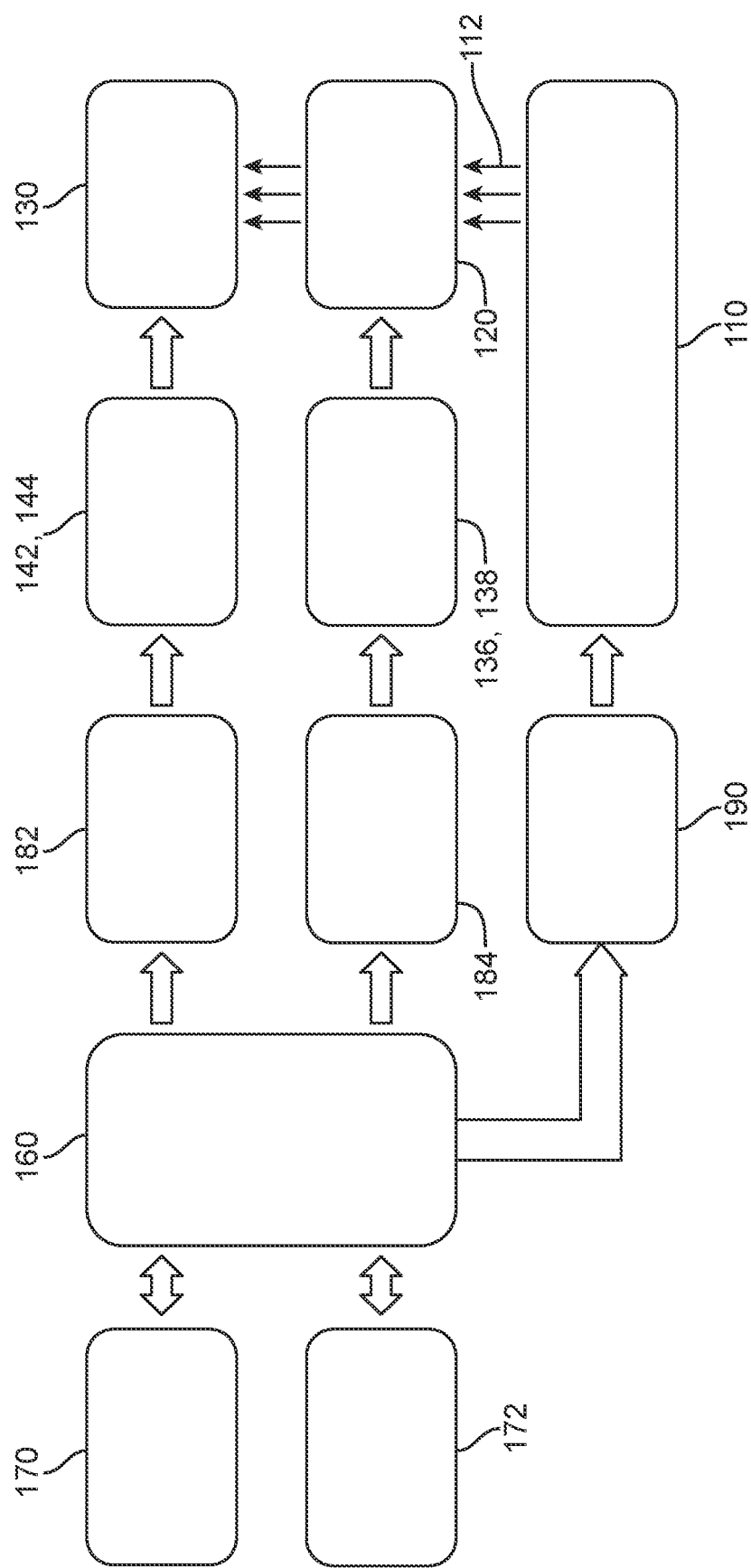
FIG. 1E illustrates the block diagram of the AFBM illustrating the important electronic and electro-mechanical components driving the $CO_2$ laser, beam deflection mechanism and articulating arm mechanism.

In various embodiments the AFBM 100 includes a control system as shown in FIG. 1E. The control system as shown in FIG. 1E includes a microcontroller 160 and associated electronic circuitry that include one or more DC-DC one or more laser drivers 190, one or more servo motor drivers 182, one or more stepper motor drivers 184, I/O expansion board for display 170, I/O expansion board for key board 172, power supplies and communication protocols. In various embodiments the microcontroller 160 is configured to receive input from the keyboard, drive the stepper motors 142, 144, one or more servo motors 136, 138 and the lighting source 110. In various embodiments the microcontroller 160 is programmed to receive input from the keyboard 172, drive the stepper motors 136, 138, drive the servo motors 142, 144, fire the $CO_2$ laser 110 for a given softening time to elevate the temperature to the desired level, raster scan the laser spot over a desired length of the optic fiber 150, rotate the arms in sequence and bend the fiber 150 to the desired bend diameter and generate an output to the display 170.

Figure 2:
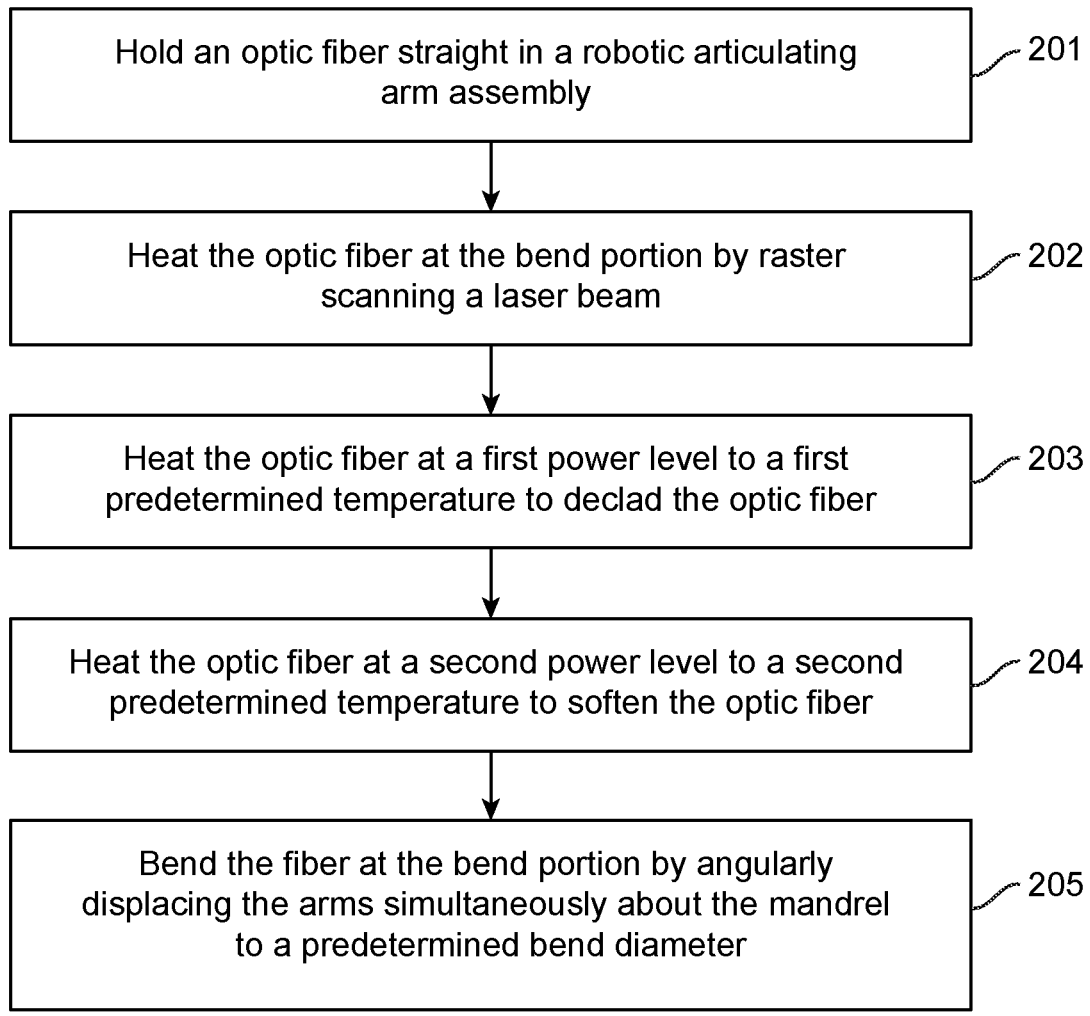
FIG. 2 depicts a flow chart for the method of fabrication of a U-bent fiber optic probe.

In various embodiments a method 200 of fabricating a U-bent optic fiber probe is disclosed. The method 200 as shown in FIG. 2 includes holding an optic fiber 150 between the arms of the robotic articulating arm assembly 130. In step 201 the optic fiber is held straight with a first end 152 and a second end 154 held at the distal ends of the arm assembly 130 and a bend portion 156 at the center of the robotic articulating arm assembly 130. The arms of the assembly 130 rotate about an axis, the axis having a mandrel 158 affixed thereon. In various embodiments the method 200, in step 202 includes heating the optic fiber in the bend region 156. The heating of the optic fiber, in various embodiments, may be carried out in two operations. In a first operation, in step 203, the fiber is heated by rastering the laser over the bend portion to a first predetermined temperature. This operation is intended to cause decladding of the fiber. The decladding may be done at a first power level. In a second operation, the fiber may be heated 204 at a second power level to cause softening of the fiber. In various embodiments the second power level for softening the fiber may be at a higher power than the first power level used for decladding. In various embodiments of the method, in steps 202-204, in addition to adjusting power level, the method may further include varying one or more of focus of the laser beam, position of the laser beam, a rate of rastering of the laser beam, a spacing between traverses, and so on. In various embodiments, the adjusting the power level may involve modulating pulse width of the laser beam.

In various embodiments in step 205 the fiber is bent at the bent portion by angularly displacing the arms 132, 134 and bending the fiber 150 at the bend region 156 about the mandrel 158 to a predetermined bend diameter.

In various embodiments the method is automated. The method includes receiving a triggering pulse by the heating source from the control system to start heating the fiber to a predetermined temperature at the bend region 156 and raster scanning the laser spot over a desired length of the optic fiber 150. In various embodiments the servomotors 142, 144 receives signals from the control system to displace the arms 132, 134 angularly and bend the fiber 150 at the bend portion 156 to a predetermined bend diameter. In various embodiments the method includes tuning the mirrors in the deflection module 130 to displace the beam towards the bend portion. In one embodiment the method includes decladding the bend region 156 by heating to a first predetermined temperature at a first laser power level. The method further includes heating the bend portion 156 to a second predetermined temperature at a second laser power level to cause softening of the fiber to bend the fiber. In various embodiments a signal is received by the servomotors 142, 144 from the control system to displace the arms 132, 134 angularly and bend the fiber 150 at the bend portion 156 to the predetermined bend diameter.

The advantages of AFBM include reduction in fabrication time, yields a repeatable and desirable bent diameter for any size of silica probes.

EXAMPLES

Example 1: Design and Working of Fiber Bending Machine

CO2 laser based controlled heat source: A $CO_2$ laser (10.6 μm wavelength, 10 W, air-cooled) was used to heat the silica fiber core. $CO_2$ laser power was controlled between 10% to 90% by using a pulse width modulated signal to the laser RF amplifiers. The laser was air-cooled using two 250 CFM fans to keep the heat sink temperatures below 50° C. The laser spot of 3.5 mm, as given in its technical specifications, was used without any focusing lens since the length of the fiber that forms the bend region is in mm.

Laser beam deflection mechanism: In order to move the laser spot over the X-Y plane of an articulating arm mechanism over which the fibers were mounted, a laser beam deflection mechanism was developed. This allowed displacement of the laser spot along the fiber as well as its localization about the fiber in the perpendicular direction. This was achieved with the help of two silicon mirrors coated with gold (93% reflectivity) held using kinematic mounts supported over a custom-made translational stage. The $CO_2$ laser beam was firstly deflected by a fixed mirror at 60° angle to the beam onto the second mirror of the translational stage. The laser beam from the second mirror on the stage was directed in the X-Y plane to the third mirror, which deflects the beam in Y-Z plane on to the work area of the articulating arms mechanism. The two mirrors on the translational stage were placed at 45° angle to the beam. The translational stage was driven by a stepper motor controlled by a central electronic control system.

Articulating arms mechanism: Articulating arms mechanism consists of two independent arms whose proximal ends were mounted over a stationary shaft to rotate them about the same axis. They were driven by two individual servo motors each of which were mounted with a spur gear that drives the respective arm through a reduction gear mechanism. Each arm equipped with a gripper mechanism consists of a micro servo motor to hold the fiber. The central decladded portion of the fiber to be bent was placed exactly at the centre of the shaft of the articulating arms in order to make sure that it remains stationary with respect to the laser beam and its exposure for heating/bending. The arms can be simultaneously displaced by synchronous input from the control unit to rotate the two servomotors from to 0° to 90° and 90° to 180°. A ceramic tile was placed below the portion of fiber that was heated using the laser spot. An exhaust fan was placed close to the ceramic tile for cooling purposes.

Central electronic control unit: The electronic control unit mainly consists of a microcontroller (e.g. A TMEGA2560) and associated electronic circuitry including DC-DC converters, laser drivers, stepper and servo motor drivers, expansion board for display and keyboard and power supplies. The microcontroller was programmed to receive input from the keyboard and generate output to the display and drive the stepper motors, servo motors and the $CO_2$ laser. RMCS-11 02 is a Rhino micro-stepping stepper motor driver for 1.8 deg Bipolar Stepper Motors. PCA9685 is the 16-channel 12-bit PWM generator working on $I^2C$ protocol to drive the servo motors. The power supply unit consists of SMPS with 30V, 10 A and 12V, 5 A DC power supplies are used for the working of $CO_2$ laser and motors (and other control circuits) respectively. A voltage switching regulator (e.g. LM2596, 3A) was used as two DC-DC converters for generating regulated 5V DC supply for microcontroller and driving the servo motors. A 12V DC supply was used to drive the stepper motor.

Probe Preparation Steps: The probes were de-cladded properly using the AFBM. A fiber of length 10 cm was taken and the jacket at the center over a length of 8 mm was removed. The probes were soaked in acetone solution for 20 minutes to remove the cladding, and was wiped with tissue and scribed with blade to remove cladding. The fiber again was soaked for 10 minutes and wiped. The jacket was removed at both end of the fiber about 20 mm, and the edges with fiber was cleaved with a cleaver. The probes were kept in hot air oven for 20 minutes at 100° C. to make them straight.

Fiber debuffering, decladding and bending procedure: The probes were wiped with acetone. The central region of the fiber was placed exactly over the origin of the shaft, which was also exposed to the laser spot. The fiber was locked to the arms by pushing them towards the L-bracket of the arms by rotating the grippers fixed to the micro servo motors. The button on the Touch screen display was pressed, the microcontroller initialized the Peripherals (i2C, SPI, IO expander, TFT display, Servo motor driver. Stepper motor driver, $CO_2$ laser driver, etc). The controller displayed the default messages on the screen and started self-test. The machine movements and default setting if everything was tested and then the microcontroller started laser setup. An error message might have been displayed if the machine had had some problem during initialization. The controller then switched on the cooler fans for $CO_2$ laser, and switched on laser power supply after a minute. The controller scanned for a feedback signal generated from $CO_2$ laser. It read a logic '1' and the laser was ready. A logic 0 indicates that there is a problem in laser power supply or laser itself and then the controller may shut down the entire system and display an error message. When the system was ready to go the controller generated the tickle pulses to pre-ionize the $CO_2$ gas to just below the lasing threshold so that any further increase in pulse width adds enough energy to the plasma to cause laser emission.

The de-cladding portion was exposed to the laser spot. The laser was fired continuously while beam deflection mechanism scanned the beam over the fiber to either debuffer/declad or bend the fiber. To bend the fiber the laser was fired for a softening time to elevate the temperature and was followed by raster scan of laser spot over the desired length and rotation of arms in sequence, switched on the $CO_2$ laser for a predefined time then the silica probe reached its melting point and started to bend and formed a 90° bend, then the controller rotated the rotating arm to 90° allowing the probe to bend 180° and form a U-Bend probe. The probe was removed from the probe holder carefully, and the process was repeated for the remaining probes.

Example 2: Experimental Settings for Fiber Debuffering, Decladding and Bending

Method: Buffer polymer clad removal conditions are shown in Table 1. Fiber bending conditions are shown in Table. 2.

TABLE 1

Buffer Polymer Clad Removal Conditions

| Probe diameter (μm) | Duty cycle (%) | Exposure time (Sec) |
|---|---|---|
| 200 | 70 | 5 cycles of movement about the center over a desired decladding length |
| 250 (polyimide buffer) | 85 | same |
| 400 | 85 | 8 cycles |
| 600 | 85 | 10 |

TABLE 2

Fiber Bending Conditions for a $CO_2$ Laser of 10 Watt with 5 kHz Frequency

| Fiber diameter (μm) | Softening time (sec) | Moving time (X-Y position) (μS X sec) | Total time required to make probe (sec) |
|---|---|---|---|
| 200 | 4 | 2 cycles of 2.4 mm movement about the center, followed by 5° of angular displacement of arms; Repetition of the process until 90° of displacement; laser power 65% duty cycle | 15 |
| 250 (silica clad fibers) | 4 | 2 cycles of 2.4 mm movement about the center, followed by 5° of angular displacement of arms; Repetition of the process until 90° of displacement; laser power 65% duty cycle | 15 |
| 400 | 9 | 2 cycles of 3.8 mm movement about the center, followed by 5° of angular displacement of arms; Repetition of the process until 90° of displacement; laser power 75% duty cycle | 60 |
| 600 | 9 | 2 cycles of 4.0 mm movement about the center, followed by 5° of angular displacement of arms; Repetition of the process until 90° of displacement; laser power 85% duty cycle | 60 |

Pre and post fabrication of fiber optic probes: A silica optical fiber of 110 cm length was taken and polished both the surface using fiber polishing sheet. Then the fiber was debuffered using the laser by exposing the fiber to 20 sec. Then the fiber was bent to U-shape by the same process with predefined exposure time and translation of mirrors for >250 μm size of the optical fiber shown in the above Table. 2.

Probe cleaning: The U-bent fiber probes were cleaned using flame and acetone in order to remove the clad materials that remain on the core surface. Briefly, the U-bent region of the fiber probes were exposed to butane flame (preferably blue region of the butane flame) followed by ultasonication by dipping in acetone for 15 mins. After, which the fiber probes were examined under optical microscope to verify the cleanliness of the fiber core surface. Exposing the U-bent to butane flame is a critical step, over exposure and/or exposing the U-region to the yellow flame will result in deformation in the probe geometry.

Figure 3:
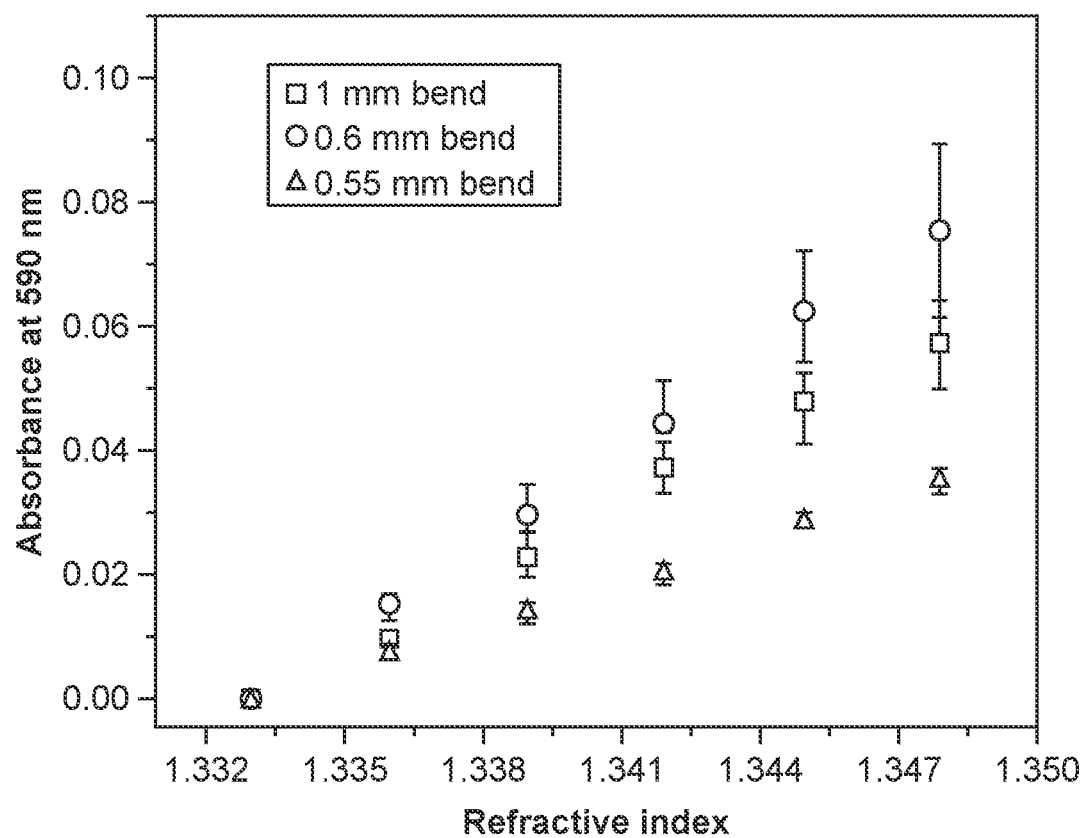
FIG. 3 illustrates the refractive Sensitivity (RI) at 590 nm.
Figure 4:
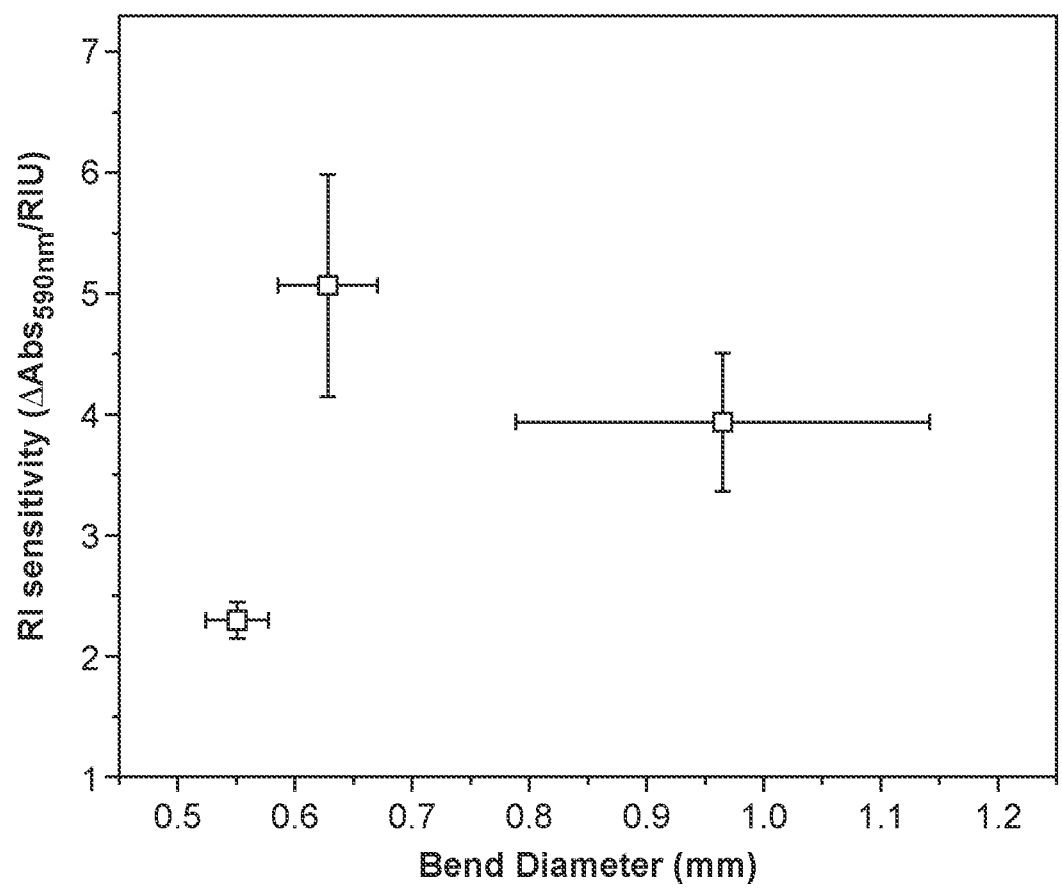
FIG. 4 illustrates the refractive Sensitivity (RI) vs. bend diameter.
Figure 5I:
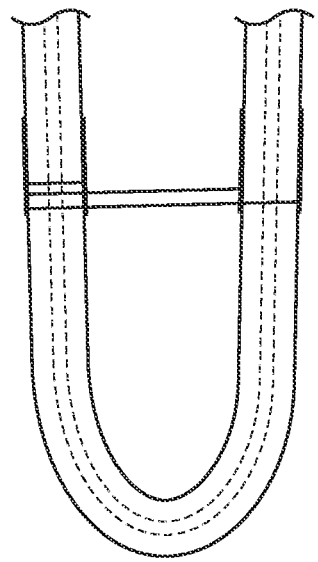
Figure 5J:
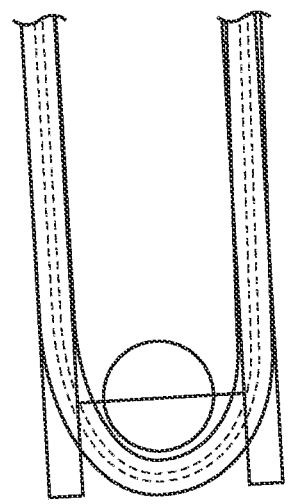

Evaluating the refractive index (RI) and evanescent wave absorbance (EW A) sensitivity: The RI sensitivity of the fabricated U-bent fiber probes were evaluated by subjecting to sucrose solution of varying RI. The sucrose solutions of varying RI including 1.34, 1.35, 1.36, 1.37, 1.38 and 1.39 were prepared by dissolving appropriate weight of sucrose in 10 mL of distilled water. To evaluate the RI sensitivity, the fabricated U-bent fiber probes (n=10) were coupled to a green LED light source and a multichannel spectrometer using a custom-made magnetic mount. The channels with intensity values of at least 30% of the detector saturation value (referred as test probes) were considered for calculating the sensitivities, while other probes were maintained as experimental controls, which was subjected to DI water in order to track the light source fluctuations and experimental errors over time. The variation in the coupling intensities were purely due to the misalignment in the magnetic mount, which is to be recovered in future. The drop in intensity values at each channel, while subjected to varying RI solution was recorded and the absorbance response at 590 nm was estimated as shown in FIG. 3, and FIG. 4 by taking intensity response of each fiber probe in water as a reference. RI sensitivity of each probe was estimated by calculating the slope and linear regression values obtained using the absorbance values.

Results: U-Bent Probes with Different Bend Diameters

Under one particular setting, silica optical fiber of diameter 200 11 m (NA=0.37, FT200UMT, Thorlabs Inc., USA) were cut into 25 cm length and decladded at the middle by firstly removing the buffer using mechanical stripper. Subsequently the polymer clad was deflagrated by a butane flame followed by wiping the decladded portion with acetone-wet tissue to any residual cladding or soot. The distal ends were cleaved using fiber cleaver to obtain a sufficiently flat and smooth ends for efficient optical coupling with light sources or detectors. Then the fibers were mounted on the bending machine and bent to obtain U-bent probes. Here, probe geometric investigations on a set of twenty probes is presented. The bend diameter of the fabricated probes was −0.752±0.048 (n=20) mm. FIG. 5A-5J shows the ability of machine to fabricate the U-bent probes with different bend diameters.

Probe-to-probe variation: Initially, the repeatability of the fabricated probes was assessed by a comparison of their refractive index sensitivity, mainly because this helps as a rapid test for the performance of a U-bent fiber probe. This study was carried out by recording the absorbance response of probes to varying refractive index of sucrose solutions (1.333, 1.342, 1.360, 1.370, and 1.381) as shown in FIGS. 6A and 6B. A significant variation in the RI sensitivity was observed among the probes with similar bend diameter values as shown in FIG. 6B. These probe-to-probe variations could be attributed to the subtle changes in the probe geometry of the U-bent region and optical coupling at the distal ends of a probe.

Figure 7A:
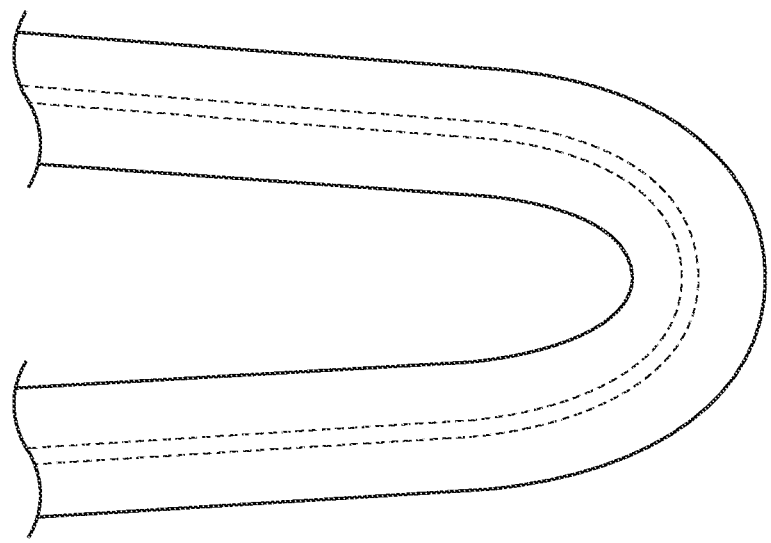
FIG. 7A illustrates the 400 μm core fiber.
Figure 7B:
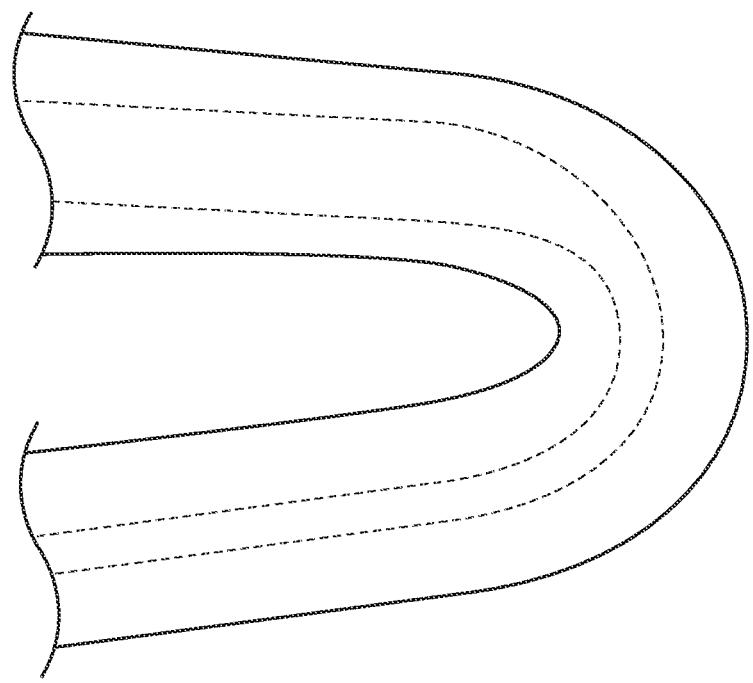
FIG. 7B illustrates the 600 μm core fiber.

The apparatus is capable of fabricating U-bent probes with different fiber core domaeters by utilizing the conditions as listed in the Table 2. FIG. 7A and FIG. 7B demonstrates U-bent probes with 400 μm and 600 μm core fibers.

Conclusion: The AFBM using $CO_2$ Laser is successfully demonstrated for the controlled and reproducible fabrication of U-bent fiber optic probes suitable for a wide range of fiber core diameters and obtain different bend diameters. The apparatus is capable of debuffering and decladding the polymer clad layer over the core without the need for any additional preprocessing steps. The optical microscopic characterization of probes shows U-bent probes with closely matching bend diameter. However, a probe-to-probe variation in RI sensitivity was observed, highlighting the dependency on their U-bent geometry. This also presses the need for further characterization of the probes before use. Nevertheless, The AFBM is a highly promising technique for the fabrication of a large number of probes with a desirable probe geometry.

Although the detailed description contains many specifics, these should not be construed as limiting the scope of the invention but merely as illustrating different examples and aspects of the invention. It should be appreciated that the scope of the invention includes other embodiments not discussed herein. While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope as delineated in the appended claims.

We claim:

1. An automated fiber bending machine (100) comprising:
   a heating source (110) configured to emit a laser beam (112) and heat one or more silica fibers (150);
   a beam deflection module (120) configured to direct the laser beam to the one or more silica fibers, wherein the beam deflection module (120) is configured to linearly displace a focal spot of the laser beam along the bend portion of the fiber to either remove polymer cladding thereon or to heat the fiber to the predetermined temperature;
   a robotic articulating arm assembly (130) comprising:
      two independent arms (132, 134) each arm having a first end and a second end and rotating about an axis;
      a shaft (146) configured to mount the second end of each arm and rotate the arms about the same axis;
      at least one servomotor (142, 144) attached to each arm (132, 134), each motor mounted with a spur gear (136, 138) configured to drive the arms;
      at least one gripper in each arm configured to hold the fiber in position; and
   a control system (130) configured to direct the heat source to heat a bend portion of the fiber and to actuate the servomotors (142, 144) to synchronously displace the arms (132, 134) angularly and bend the fiber (150) to 180° at the bend portion (156) to a predetermined bend diameter.

2. The machine as claimed in claim 1, wherein the heating source (110) is a $CO_2$ laser.

3. The machine as claimed in claim 1, the control system comprising a microcontroller (160) having a processor, memory, a display (170), and a keyboard (172) and wherein the microcontroller is configured to actuate the heating source, the beam deflection module, and the robotic arm assembly in a predetermined sequence based on instructions stored in the memory, or inputs received via the keyboard or both.

4. The machine as claimed in claim 1, comprising a mandrel (158) and wherein the bend diameter of the fiber is controllable by varying a diameter of the mandrel (158).

5. The machine as claimed in claim 1, the deflection module (120) comprising:
   a first mirror (122) fixed at a predetermined angle with respect to the emitted laser beam (112) and configured to reflect the beam through an angle;
   a second mirror (124) configured to receive the reflected beam from the first mirror (122) and reflect the beam through an angle; and
   a third mirror (126) configured to receive the reflected beams from the second mirror (124) in an X-Y plane and deflect the beam in a Y-Z plane towards the one or more silica fibers (150).

6. The machine as claimed in claim 5, wherein the first mirror (122) is placed at an angle of 60° with respect to the emitted laser beam (112).

7. The machine as claimed in claim 5, wherein the second and the third mirror (124, 126) are placed at an angle of 45° with respect to the emitted laser beam (112).

8. The machine as claimed in claim 1, wherein the laser is controlled by a pulse width modulated signal.

9. The machine as claimed in claim 1, wherein the articulating arm assembly is configured to hold the fiber on a first end (152) in one arm (132) and a second end (154) with in the other arm (134) with the bend portion (156) held therebetween.

* * * * *